Nov. 26, 1963 C. E. KRAUSE 3,112,450

PULSE RESOLUTION CIRCUIT WITH GATED DELAY MEANS AND FLIP-FLOP PROVIDING SELECTIVE SEPARATION BETWEEN RANDOM INPUTS

Filed Aug. 15, 1962

5 Sheets-Sheet 1

INVENTOR
C. E. KRAUSE
BY SEHollander
ATTORNEY

Nov. 26, 1963 C. E. KRAUSE 3,112,450

PULSE RESOLUTION CIRCUIT WITH GATED DELAY MEANS AND FLIP-FLOP PROVIDING SELECTIVE SEPARATION BETWEEN RANDOM INPUTS

Filed Aug. 15, 1962

5 Sheets-Sheet 2

INVENTOR
C. E. KRAUSE
BY
SE Hollander
ATTORNEY

Nov. 26, 1963

C. E. KRAUSE 3,112,450

PULSE RESOLUTION CIRCUIT WITH GATED DELAY MEANS AND FLIP-FLOP PROVIDING SELECTIVE SEPARATION BETWEEN RANDOM INPUTS

Filed Aug. 15, 1962

5 Sheets-Sheet 3

INVENTOR
C. E. KRAUSE
BY
S E Hollander
ATTORNEY

INVENTOR
C. E. KRAUSE
BY S E Hollander
ATTORNEY

Nov. 26, 1963
C. E. KRAUSE
3,112,450
PULSE RESOLUTION CIRCUIT WITH GATED DELAY MEANS AND FLIP-FLOP PROVIDING SELECTIVE SEPARATION BETWEEN RANDOM INPUTS
Filed Aug. 15, 1962
5 Sheets-Sheet 5

INVENTOR
C. E. KRAUSE
BY
SE Hollander
ATTORNEY

United States Patent Office 3,112,450

Patented Nov. 26, 1963

3,112,450

PULSE RESOLUTION CIRCUIT WITH GATED DELAY MEANS AND FLIP-FLOP PROVIDING SELECTIVE SEPARATION BETWEEN RANDOM INPUTS

Charles E. Krause, Columbus, Ohio, assignor to Bell Telephone Laboratories, Incorporated, New York, N.Y., a corporation of New York Filed Aug. 15, 1962, Ser. No. 217,096
12 Claims. (Cl. 328—109)

Figure 1:
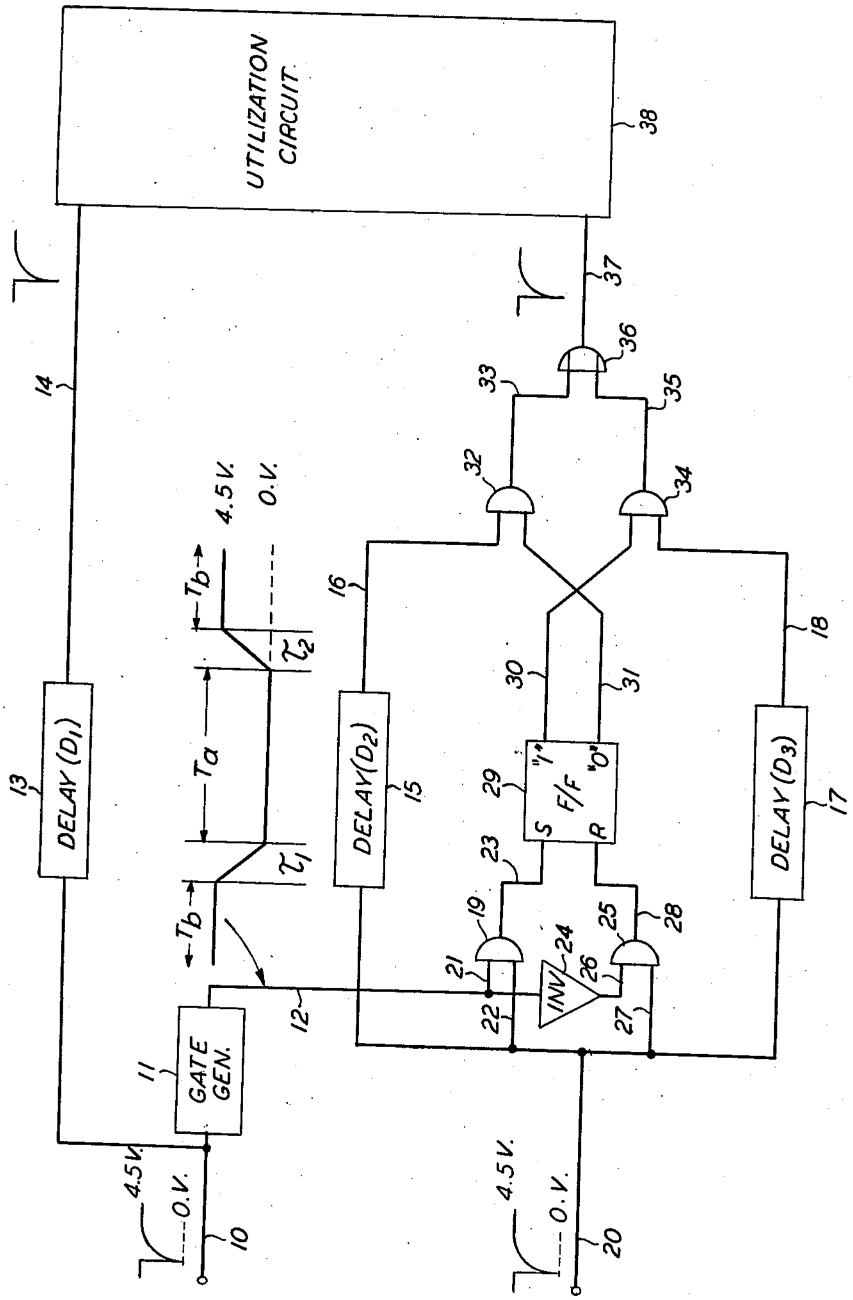

This invention relates to pulse circuits and, more particularly, to a circuit for providing sufficient resolution time between randomly occurring pulses.

Electronic designers have been increasingly concerned with the ability of components to operate reliably in the short time intervals which are now required in many electronic circuits. Such circuits must be able to respond to pulses of quite narrow duration and spacing, often in the microsecond range. Consequently, the problem is presented of providing sufficient time between such signals to allow a high speed circuit to properly operate in response thereto.

These high speed requirements are evident in many modern communications systems. With the advent of the electronic switching systems in the telephone industry, and the fully electronic central office, telephone circuits now join with the other switching arrangements needing such high speed operation. For example, a magnetic core memory may comprise an essential part of a test set for an electronic control office and since an occasion may arise when two pulses are transmitted to the memory within very short intervals of each other, provision must be made to distinguish between such signals when the system is being tested. Similarly, in computer technology or in many other counting arrangements, input signals will be delivered to the digital machine or counter from two or more sources of randomly occurring pulses. Should these pulses be separated by a time interval greater than the machine's resolution time, the circuit will have no trouble in operating. The problem arises, however, when these signals occur closer together, the worst case condition being when the two or more signals occur simultaneously. In such a situation, were it not for the provision of a structure such as the instant invention, the circuit presumably responsive to these input signals might completely ignore one or more of them. This would obviously destroy a count or an instruction to a memory address, or hamper any one of a number of similar functions.

In the past, this problem has been partially overcome in certain arrangements by merely arbitrarily delaying one of, say, two inputs by a fixed amount; assuming that the two inputs are completely random, this system is as ineffective as one which provides no delay at all. This can be seen from the fact that should a pulse arrive at the second input after a lapse of time equal to the fixed amount by which the first pulse is delayed, a case of simultaneous pulsing at the circuit's output terminals is once again encountered.

Furthermore, some prior art devices were ineffective due to their inability to respond properly when either one or more of the input signals arrived at the circuit and encountered a transient condition in the receiving crcuit. With the increasing prevalence of switching circuits, such transient conditions have often been troublesome in their frequency of occurrence, but an efficient pulse resolution circuit, for example, must be able to deal as effectively with transients as with stable electrical levels.

It is an object of this invention to provide an improved pulse resolution circuit.

It is a further object of this invention to provide a pulse resolution circuit which is more flexible in design and which is capable of determining which one of a plurality of delay units to activate.

It is also an object of this invention to furnish a pulse separator circuit which is capable of providing sufficient resolution time between randomly occurring pulses on different inputs to the same circuit.

Another object of this invention is to provide a pulse circuit which will perform reliably even as to input signals encountering transient conditions in the pulse separator circuitry.

In one illustrative embodiment of this invention, a pulse resolution circuit with two input terminals is disclosed. A pulse arriving at the first of these inputs is always effective to energize a first delay unit and is thereby delayed by the time value of the unit. A pulse arriving at the second input to the circuit may be transmitted to the corresponding second output through one of two delay units, one of these units providing a longer delay and one a shorter delay than that provided by the delay unit associated with the first input terminal.

Should two input pulses arrive at the respective input terminals spaced by an amount greater than a predetermined interval (such interval being electrically represented by the duration of the output signal from a gate generator triggered by the arrival of the first pulse), both pulses will proceed through the circuit in normal fashion, the first pulse being delay by its associated delay unit and the second pulse bieng delay by the shorter of the two delay units associated with the second input. The shorter delay unit is selected in such a situation by circuitry whose combined operation has the effect of blocking an output gate which is associated with the longer of the two delay units, and therefore the only available transmission channel for the second input pulse is through the shorter delay unit. Thus, if pulses arrive at the two input terminals more than, say, 50 microseconds apart, the first pulse could be delayed by 25 microseconds, while the second pulse would be delayed by the shorter of its two associated delay units, say 3 microseconds, instead of the longer delay of perhaps 47 microseconds.

If the second input pulse to the circuit arrives within the predetermined interval after the arrival of the first pulse, the circuit must operate so as to provide sufficient resolution time for the device to which these pulses will be delivered. Operating similarly as above, the first pulse will be delayed by its uniformly associated delay, while the second pulse is delayed by the longer of the two delay units coupled to the second input terminal. The outputs associated with the first and second input terminals thus exhibit pulse signals sufficiently far apart in time so that the device to receive these signals may properly operate. For example, the pulses might arrive within a predetermined interval of 50 microseconds of each other, and while the first pulse would again be delayed by the fixed 25 microsecond delay mentioned supra, the second pulse would now be delayed by the longer of its two possible delay periods, e.g., 47 microseconds instead of 3 microseconds.

A situation which can be classified as the most critical, although from a probability standpoint the one which is the least frequent, is that in which pulses arrive simultaneously at the first and the second input terminals to the circuit. The instant invention is particularly adapted to cope with such an occurrence. As is the case with any sequence of arriving pulses, the pulse arriving at the first input terminal energizes its associated delay unit and gate generator. The pulse arriving at the second input terminal can be, it will be recalled, delayed by one of two differently timed intervals. The output of the gate generator, which acts as the input signal to other circuitry controlling a bistable device, may be in a transient condition during the time when the second input pulse is also transmitted to this circuitry. It would initially appear that a problem might exist if ambiguous signals were provided to the inputs of the bistable device (flip-flop). This might result, under extreme circumstances, in simultaneous pulsing of both the set and reset inputs to the flip-flop, normally an intolerable condition due to the uncertainty associated with the flip-flop's output in such a situation.

It is recognized that the flip-flop, when both of its inputs are pulsed simultaneously, will give only a "1" or a "0" output, but the one of these two outputs chosen is usually critical to the circuit's operation. However, the instant invention is so arranged that in the case of simultaneous arrival of pulses at the two inputs to the circuit, the resolution time maintained between the two output signals will be the same irrespective of which of the two delay units associated with the second input terminal is energized. This result is obtained by making the difference between the longer of the two delay units associated with the second input terminal and the delay unit associated with the first input terminal equal in time separation to the difference between the delay represented by the first delay unit and that represented by the shorter of the delay units associated with the second input terminal.

Thus, illustratively, when two pulses arrive at the circuit's two inputs simultaneously, the pulse arriving at a first of the inputs is delayed by its associated 25 microsecond delay. Assuming that some uncertainty may be associated with the operation of the flip-flop, the pulse at the second input might be delayed by either of the two illustrative delay values, i.e., 3 microseconds or 47 microseconds. But it is immediately apparent that whichever of the two delays is in fact operative to delay the pulse at the second input, the output resolution time will be the same—namely, 22 microseconds furnished by (25−3) microseconds if the circuit should select the 3 microsecond delay for the pulse at the second input, or by (47−25) microseconds if the circuit should select the 47 microsecond delay for the pulse at the second input.

A feature of this invention includes facilities for uniformly separating randomly occurring pulses at two separate input terminals by at least a minimum predetermined interval.

A further feature of this invention includes flexible delaying means whereby a pulse arriving at one input terminal is delayed by a first interval and a pulse arriving at the second input terminal is delayed by one of two different time intervals depending on the time proximity of the pulses at the two inputs.

Another feature of this invention includes a bistable device for determining which of the two delay elements associated with the second input terminal is effective in delaying a pulse at that input.

An additional feature of this invention includes means for properly responding to the simultaneous arrival of pulses at the circuit inputs when a transient condition is encountered.

These and other objects and features of this invention will become apparent when taken in conjunction with the following specification, the appended claims and the drawing in which:

FIG. 1 is a schematic representation of an illustrative pulse resolution circuit embodying the principles of this invention; and FIGS. 2, 3, 4 and 5 are time diagrams respectively illustrating symbolic electrical conditions at various points in the circuit of FIG. 1 in the cases of pulses arriving at the circuit's inputs: (*a*) sufficiently widely spaced, (*b*) randomly spaced in a different sequence from FIG. 2, (*c*) within a predetermined interval of each other, or (*d*) simultaneously; the base lines in each of FIGS. 2, 3, 4 and 5 represent the lower of two circuit voltage levels, the upper of these two levels being similarly shown therein and representing the circuit's "steady-state" condition—these levels may be, as discussed infra, 0 volt and +4.5 volts respectively.

The pulse resolution circuit illustrated in FIG. 1 includes two input terminals 10 and 20 and two output conductors 14 and 37 providing the separated pulse signals to a utilization circuit 38. Coupled to terminal 10 are gate generator 11 and delay unit 13; delay units 15 and 17 are associated with terminal 20. The delay units 13, 15 and 17 as well as the gate generator 11 are similarly constituted and may advantageously comprise monostable multivibrators such as that shown on page 600 of "Pulse and Digital Circuits" by Millman and Taub (McGraw-Hill Book Company, Inc., 1956). The gate generator 11 is triggered by a pulse at terminal 10 and provides the standard monostable multivibrator level output shown at conductor 12 in FIG. 1. The output signal of the generator 11 remains in the higher of two possible states during $T_b$ until it is triggered by a signal at terminal 10. After such a triggering signal arrives, the output signal at conductor 12 falls to the lower of the two conditions, this being the quasi-stable condition of the multivibrator existing for the time interval denoted as $T_a$. In switching from the higher stable state to the quasi-stable state, and also in switching back from the quasi-stable state to the stable state, two transient conditions denoted respectively as $\tau_1$ and $\tau_2$ are indicated. The pulse outputs from elements 13, 15 and 17 may be obtained by differentiating and rectifying the output signal of a monostable multivibrator in a well-known manner.

The AND gates 19 and 25 are responsive to simultaneously applied signals of the lower of the two circuit levels (illustratively; these levels may be 4.5 volts and 0 volt, and these values will hereinafter be referred to where appropriate) at their respective input terminals 21 and 22 and 26 and 27. That is, AND gate 19 will deliver a pulse output signal on its lead 23 if both of the signals on leads 21 and 22 are simultaneously at the circuit's lower voltage level, i.e., 0 volt; similarly AND gate 25 will deliver a pulse output signal on its lead 28 if both of the signals on its input leads 26 and 27 are simultaneously at the lower of the two circuit voltage levels. Inverter 24 serves to invert the gating signal existing on lead 12 shown in FIG. 1, the inverted signal being transmitted to lead 26. The flip-flop 29 is responsive to pulses from leads 23 and 28 transmitted to its set and reset terminals, S and R respectively. Assuming that the two voltage levels used in the circuit are 4.5 volts and 0 volt, the "1" output of the flip-flop 29 on lead 30 will normally be at 0 volt, while the "0" output on lead 31 will normally be at 4.5 volts. When the set input S is pulsed by a 4.5 to 0 volt pulse from lead 23, the flip-flop's outputs will respond thereto with the "1" output on lead 30 switching to 4.5 volts, and the "0" output on lead 31 dropping to 0 volt. Such a condition will be maintained until a reset pulse is provided from lead 28 to the flip-flop, in which case the flip-flop's two output terminals will return to their original conditions. If a subsequent reset pulse should now arrive from lead 28 while lead 31 is at 4.5 volts, the flip-flop's output terminals would remain unaffected.

The AND gates 32 and 34 are identical to the gates 19 and 25 described supra, gate 32 being responsive to the simultaneous lower voltage level signals on leads 16 and 31, and gate 34 being responsive to similarly arranged signals on leads 18 and 30. Appropriate pulsing of the circuit will result in the transmission of a pulse from either AND gate 32 or AND gate 34 on leads 33 or 35 respectively, to OR gate 36, the latter being responsive to pulses of the lower of the two voltage levels in the circuit on either lead 33 or 35 to provide an output pulse on lead 37 to the utilization circuit 38.

*Case I: Input Pulse Arrives on Terminal 20 After $T_a$*

Figure 2:
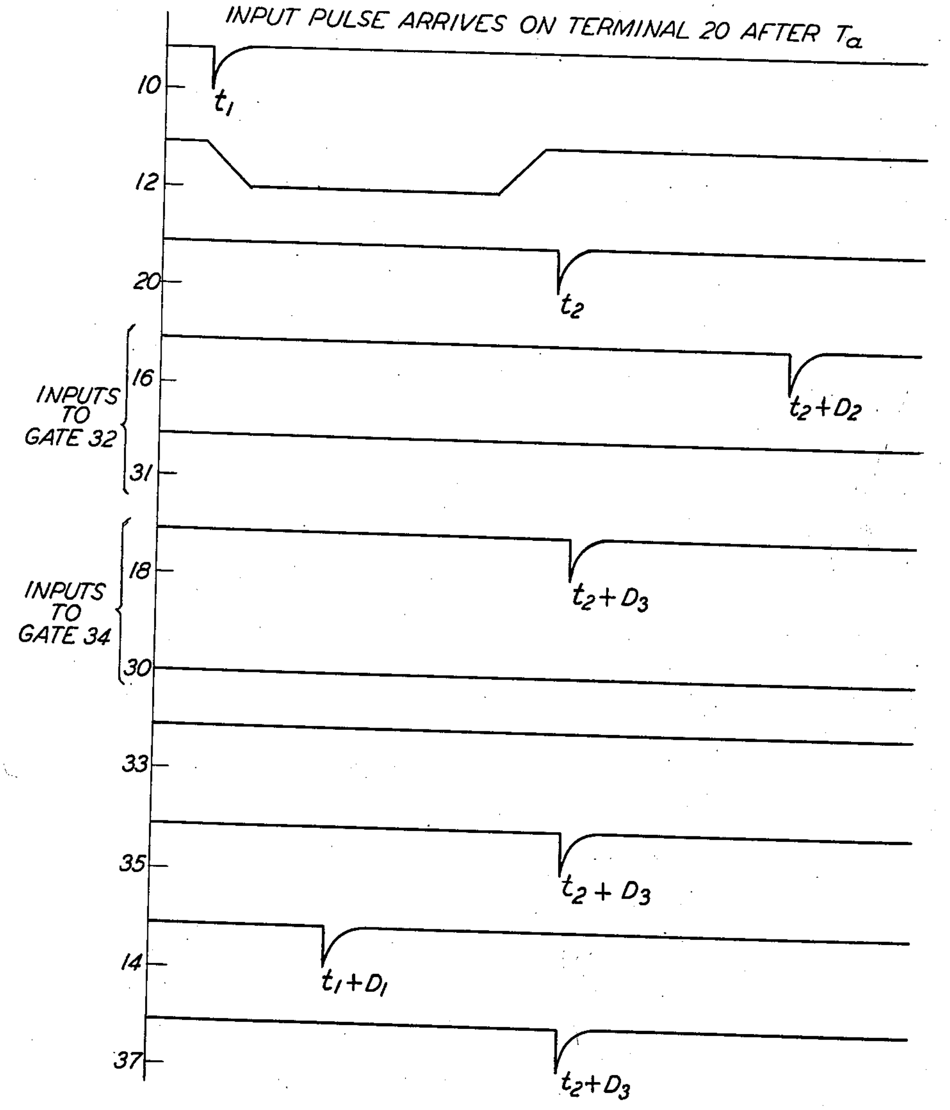

Taking the pulse resolution circuit of FIG. 1 in conjunction with the timing diagram of FIG. 2, we see the situation in which pulses arrive at the respective input terminals 10 and 20 such that the input on terminal 20 occurs during time $T_b$ and after time $T_a$, the latter being the nominal "decision interval" of the circuit. The resolution time of utilization circuit 38 is represented electrically by the minimum time separation that the instant invention can provide under the worst case condition of the simultaneous arrival of pulses, to be discussed infra in Case IV. Following the timing sequence shown in FIG. 2, and with the voltage levels at the correspondingly numbered terminals or conductors of FIG. 1 represented on the common vertical axis shown in FIG. 2, it is seen that an input pulse arrives at terminal 10 at time $t_1$. Such a pulse initially activates gate generator 11 producing the quasi-stable lower voltage condition mentioned supra with regard to conductor 12, and also shown in FIG. 2. A second input pulse is now assumed to arrive at terminal 20 at time $t_2$ after the output signal on conductor 12 has returned to its monostable upper voltage level, this input time sequence being shown in the first three lines of FIG. 2.

The pulse input signal at terminal 20 can be delayed either by the time interval provided by delay unit 15 or by delay unit 17, the respective delays being denoted as $D_2$ and $D_3$. It has been postulated that the pulse at terminal 20 only arrives there during $T_b$, this time representing the interval during which the output of gate generator 11 is at its stable upper voltage level of 4.5 volts as shown in the time sketch at conductor 12 in FIG. 1. Therefore, when the input pulse arrives at terminal 20 and is thereafter delivered on conductors 22 and 27 to AND gates 19 and 25 respectively, the signals at the other inputs to these two AND gates, namely conductors 21 and 26 respectively, will be as follows: conductor 21 will exhibit 4.5 volts since $T_a$ has already elapsed, while conductor 26 will exhibit the inverted signal thereby providing a 0 volt level to AND gate 25.

By this analysis, it is seen that when the pulse signal arrives at terminal 20 with the time sequence of Case I applied, AND gate 25 will be enabled and will deliver a negative-going pulse on lead 28 to the reset terminal R of the flip-flop 29. Since the flip-flop 29 is assumed to have been in a reset state prior to this sequence of pulses, such an input signal to its reset terminal R will have no effect on the signals existing at the flip-flop's output conductors 30 and 31. Therefore, as mentioned supra with respect to the operation of flip-flop 29, a 0 volt level is maintained on conductor 30, while a 4.5 volt level is maintained on conductor 31; these voltage levels are indicated at the correspondingly numbered lines in FIG. 2.

The arrival of the pulse at terminal 20 at time $t_2$ as shown in FIG. 2 also has the effect of activating the pulse output delay elements 15 and 17. Such a pulse output is provided at the respective output terminals 16 and 18 of these two delay elements at the times $t_2+D_2$ and $t_2+D_3$ respectively. The inputs to AND gate 32, being the voltage signals on leads 16 and 31, are seen in FIG. 2 to never be simultaneously at the same requisite lower voltage level that will enable the gate. The inputs to AND gate 34, on the other hand, are the uniform 0 volt level on lead 30 and the 0 volt pulse at time $t_2+D_3$ as shown in FIG. 2; the presence of two simultaneous 0 volt signals at the inputs to AND gate 34 enable that gate and provide a similar pulse output on conductor 35 at time $t_2+D_3$. Conductor 33 however, since AND gate 32 remains disabled, exhibits a constant 4.5 volt level.

The OR gate 36 passes the lower level pulses to output conductor 37 when such a pulse arrives either on lead 33 or on lead 35, so that a pulse output will be delivered on lead 37 to the utilization circuit 38 at time $t_2+D_3$ as shown in the bottom line of FIG. 2. The prior arrival of a pulse at terminal 10 had the effect of also energizing delay unit 13, thereby providing a pulse output on lead 14 to utilization circuit 38 at time $t_1+D_1$ as shown in the next to the bottom line of FIG. 2. Thus, it can be seen that the path "selected" by flip-flop 29 for the transmission of the pulse arriving at input terminal 20 during time $T_b$ and after time $T_a$ to utilization circuit 38, is the path which includes terminal 20, delay unit 17, conductor 18, AND gate 34, conductor 35, OR gate 36 and conductor 37.

The structure of the circuit is such that the delay $D_3$ provided by unit 17 is substantially shorter in time than is the delay $D_2$ provided by unit 15; and since the operation of the output signal of the gate generator 11 has indicated to the flip-flop 29 by means of the AND gates 19 and 25 that the pulse has arrived at terminal 20 sufficiently far removed in time from the pulse at terminal 10, the flip-flop 29 should disable AND gate 32 associated with the longer delay $D_2$ provided by delay unit 15, and also enable AND gate 34 associated with the much shorter delay $D_3$ provided by delay unit 17 (delay $D_3$ may be illustratively chosen to be just greater than the operate time of the flip-flop 29). This is precisely the way in which the circuit operates in this particular case, the pulses arriving at the respective output terminals 14 and 37 separated in time by an amount equal to $$(t_2+D_3)-(t_1+D_1)$$

the circuit thereby having separated the two pulses only by the additional amount of $(D_1-D_3)$.

To give an illustrative example of circuit operation involving the instant invention, some actual time parameters that may advantageously be employed will now be indicated. These values are intended to be merely suggestive and should in no way be taken as limitations to the invention. With the time delays $D_1$, $D_2$ and $D_3$ provided by delay units 13, 15 and 17 being respectively 25, 47 and 3 microseconds, the time $T_a$ during which the level output of gate generator 11 is at its 0 voltage or quasi-stable state may be 50 microseconds. Thus, should a pulse arrive at input terminal 20 more than 50 microseconds after one has arrived at input terminal 10, the pulse at terminal 10 will be delayed by the 25 microseconds provided by delay unit 13, while the input pulse at terminal 20 will be delayed only by the 3 microsecond delay provided by delay unit 17.

More specifically, assume that a pulse arrives at input terminal 20 sixty microseconds after the arrival of a pulse at input terminal 10. That is, with reference to FIG. 2, $t_1=0$ and $t_2=60$ microseconds. The pulse at terminal 10 will be delayed by 25 microseconds, arriving at the utilization circuit 38 on lead 14 at time $t_1+D_1=(0+25)$ microseconds=25 microseconds. As described supra, the pulse at terminal 20 will be delayed by the $D_3$ delay provided by delay unit 17, thereby arriving at the utilization circuit 38 on lead 37 at time $t_2+D_3=(60+3)$ microseconds=63 microseconds. The output pulses are thus separated by $(63-25)=38$ microseconds, sufficient to exceed an assumed minimum resolution time of 22 microseconds for the utilization circuit 38.

*Case II: Input Pulse Arrives on Terminal 20 Before $T_a$*

A situation which is generally analogous to Case I, described supra, is the one in which a pulse arrives on terminal 20 during the time $T_b$ but prior to time $T_a$. This situation is diagrammed in FIG. 3, wherein a pulse is shown arriving on terminal 20 at time $t_2$ with a subsequent pulse following at time $t_1$ on input terminal 10; the latter thereby initiates the gate generator output signal, the quasi-stable state of which lasts for time $T_a$ as previously described.

The delay units 15 and 17 are initially energized at time $t_2$ by the presence of the input pulse on terminal 20. Thus, as shown in FIG. 3, a similar output pulse will be displayed on conductor 16 at time $t_2+D_2$ and on conductor 18 at time $t_2+D_3$.

When the negative-going input pulse on terminal 20 is delivered to AND gate 19 via lead 22, the signal on the other input lead (21) to AND gate 19 is at the upper or 4.5 volt level; AND gate 19 will therefore not be enabled. The arrival of the input pulse on terminal 20, when it is delivered to AND gate 25 on lead 27, however, will be effective to enable AND gate 25 due to the inversion accomplished by ineverter 24 of the gate generator output signal shown at conductor 12 in FIG. 1. The two inputs to AND gate 25 will thus both be at the lower or 0 volt level at time $t_2$, thereby resulting in the delivery of a pulse signal to the reset terminal R of the flip-flop 29 on lead 28. If it is assumed, as it has been so far, that flip-flop 29 is already in the reset condition, no change will occur on its output conductors 30 and 31, which will remain respectively at their 0 volt and 4.5 volt levels.

Figure 3:
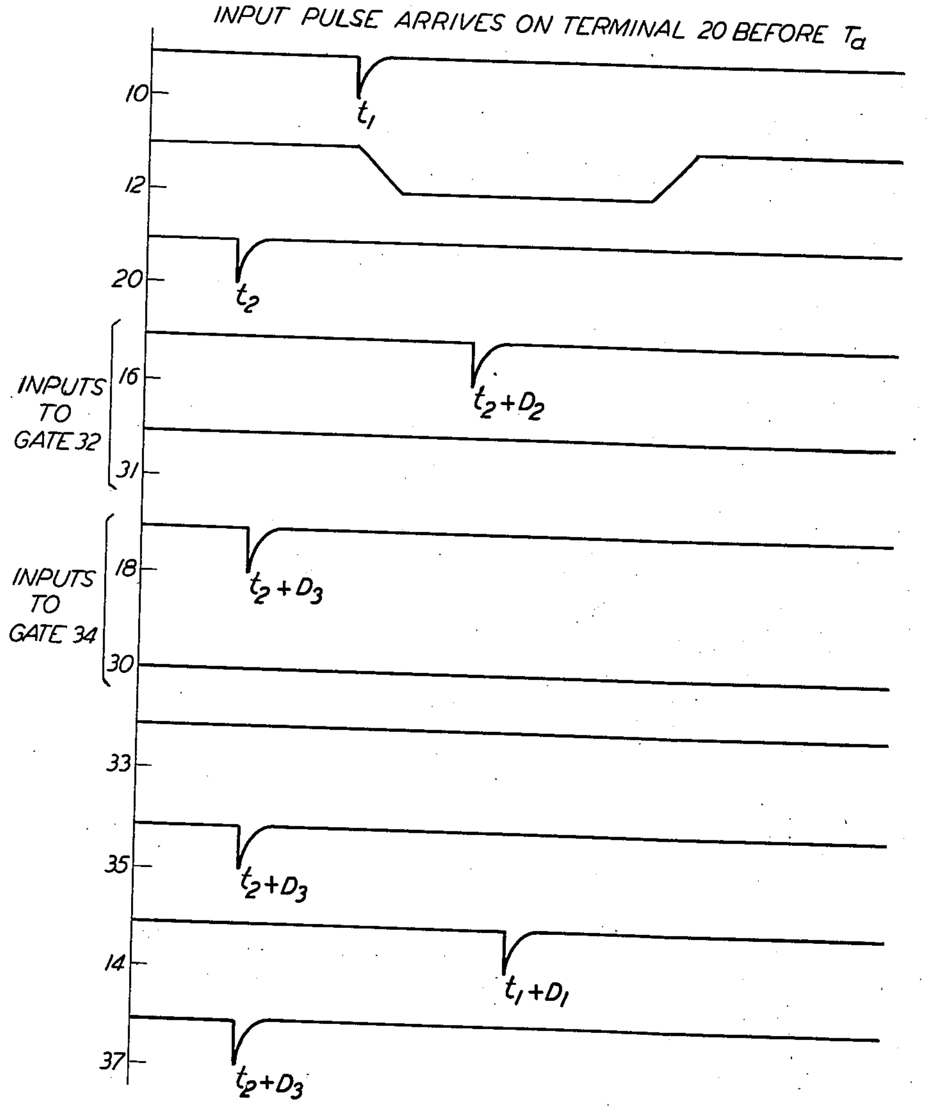

From this analysis, and from a corresponding inspection of FIG. 3, it can be seen that at no time will both the inputs (leads 16 and 31) to AND gate 32 be at the simultaneous lower levels necessary for enabling the gate. However, it will similarly be noted that the input leads 30 and 18 to AND gate 34 will display simultaneous lower level inputs at time $t_2+D_3$, thereby enabling AND gate 34 and delivering a pulse signal on lead 35 through OR gate 36 and to utilization circuit 38 over conductor 37 at time $t_2+D_3$.

The other input pulse on terminal 10 arrives thereon at time $t_1$, shown in FIG. 3 to occur subsequent to $t_2$. Delay unit 13 is then activated and a pulse output is straightforwardly transmitted to the utilization circuit 38 on lead 14 at time $t_1+D_1$. Since the input pulse on terminal 20 arrives thereon prior to the triggering of the gate generator 11 by the pulse on terminal 10 at $t_1$, the aforementioned gate generator output plays no substantial role in this particular case. With regard to the bottom two lines of FIG. 3, it can be seen that the pulses, when delivered to the utilization circuit 38, are separated in time by an amount equivalent to the difference $(t_1+D_1)-(t_2+D_3)$.

In terms of actual time values, it may initially be assumed that the pulse to input terminal 20 arrives thereon 20 microseconds prior to the arrival of an input pulse on terminal 10; i.e., $t_2=0$ and $t_1=20$. As discussed supra in this case, the input pulse on terminal 20 will be transmitted to the utilization circuit 38 over lead 37 at time $t_2+D_3=(0+3)$ microseconds=3 microseconds. Furthermore, the input pulse on terminal 10 will be delivered to the utilization circuit 38 over lead 14 at time $t_1+D_1=(20+25)$ microseconds=45 microseconds. Thus, it can be seen that under these circumstances, pulses are delivered to the utilization circuit 38 separated in time by $(45-3)$ microseconds=42 microseconds, sufficient to allow the utilization circuit 38 to properly respond to each of the pulses.

*Case III: Input Pulse Arrives on Terminal 20 During* $T_a$

Figure 4:
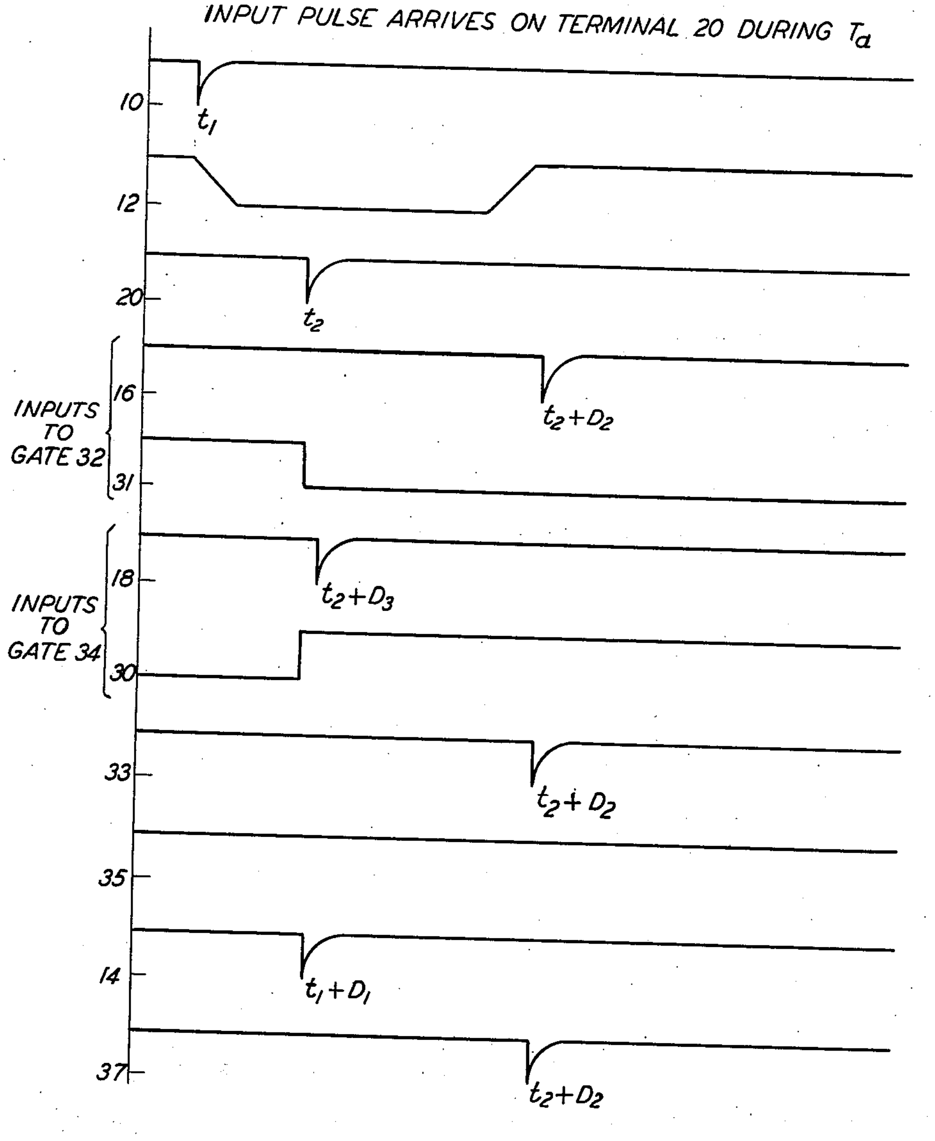

If a pulse arrives at input terminal 20 during the time $T_a$ when the output signal from gate generator 11 on conductor 12 in FIG. 1 is in its 0 volt or quasi-stable state, as shown in the first three lines of FIG. 4, the instant invention operates to insure that at least a minimum time separation will exist between the output pulses at terminals 14 and 37. The operation of the AND gates 19 and 25 under these circumstances is generally similar to that described supra. Since the 0 volt pulse arrives at terminal 20 and thus also on lead 22 during the time that the 0 volt level is present on conductor 12 and thus also on conductor 21, AND gate 19 will be enabled, thereby providing a negative-going pulse signal on lead 23 to the set terminal S of the flip-flop 29. Due to the inversion of the output signal of gate generator 11 achieved by inverter 24, a 4.5 volt level is present on conductor 26 when the 0 volt pulse from terminal 20 is present on lead 27; AND gate 25 will therefore not deliver any pulse input to the reset terminal R of flip-flop 29.

The flip-flop 29 responds to the input signal at its set terminal S by switching the 0 volt level at its "1" output terminal on lead 30 to 4.5 volts and also, since the flip-flop's outputs continuously act as the complements of each other, by switching the prior 4.5 volt level at its "0" output on lead 31 to 0 volt, shown on the lines numbered 30 and 31 in FIG. 4.

Since the pulse input at terminal 20 was effective to energize the delay units 15 and 17, a 0 volt pulse will appear on leads 16 and 18 at times $t_2+D_2$ and $t_2+D_3$ respectively, as shown on the appropriately numbered lines of FIG. 3. Therefore, at time $t_2+D_2$, the two inputs to AND gate 32 will both be at a 0 volt level, thereby enabling gate 32 and providing a pulse output on lead 33. Gate 34, on the other hand, will not be enabled, since at no time do the two input terminals (leads 18 and 31) to that gate exhibit simultaneous lower voltage levels. The pulse output from lead 33 will energize OR gate 36 and be delivered on conductor 37 to the utilization circuit 38 at time $t_2+D_2$ shown in the bottom line of FIG. 4. Since the prior arrival of a pulse on terminal 10 of FIG. 1 has activated delay unit 13, a pulse output will similarly be delivered at time $t_1+D_1$ to the utilization circuit 38 on conductor 14 as shown in the next to the bottom line of FIG. 3.

The flip-flop 29 has thereby responded to the signal on its set input terminal S by blocking the passage of the pulse to input terminal 20 through the transmission path including delay unit 17 and AND gate 34, and has instead enabled AND gate 32 to allow the passage of the pulse at terminal 20 through the path including the delay unit 15, conductor 16, AND gate 32, lead 33, OR gate 36, and conductor 37 to utilization circuit 38. The pulses thereby arrive at the utilization circuit 38 of FIG. 1 separated in time by an interval equivalent to the difference between $(t_2+D_2)$ and $(t_1+D_1)$. The additional separation introduced by the instant pulse resolution circuit is that represented by the difference $(D_2-D_1)$. The utilization circuit 38 is thereby assured of having sufficient time separation between the input signals on leads 14 and 37 to operate properly regardless of how proximately within the period $T_a$ the pulses at input terminals 10 and 20 arrive.

A specific illustration of Case III operation of this invention would be where a pulse arrives at input terminal 20 only 15 microseconds after one has priorly arrived at input terminal 10 (see FIG. 4). With $t_1=0$ and $t_2=15$ microseconds, the delay unit 13 is energized to delay the pulse on lead 10 by 25 microseconds and to thus deliver a pulse output to utilization circuit 38 on lead 14 at time $t_1+D_1=(0+25)$ microseconds=25 microseconds. By the action described supra for Case III, the pulse at terminal 20 will be delayed by the time delay provided by delay unit 15, a pulse output thus appearing on output lead 37 at time $t_2+D_2=(15+47)$ microseconds=62 microseconds. The pulses delivered to the utilization circuit 38 are therefore $(62-25)$ microseconds=37 microseconds apart; this is sufficiently greater than the 22 microsecond minimum resolution time assumed to be required by the utilization circuit 38, whereas absent the instant invention, the 15 microsecond separation at input terminals 10 and 20 would not have allowed the utilization circuit 38 to properly respond to both signals.

*Cases IV: When Pulses Arrive at Terminals 10 and 20 Simultaneously*

The situation with which a pulse resolution circuit must be able to deal especially effectively is the one in which pulses arrived simultaneously at the circuit's inputs. With regard to the instant invention and particularly FIGS. 1 and 5 thereof, the specific instance with which we are now concerned is where a pulse arrives at input terminal 10 at time $t_1$ at the same time that a pulse arrives at terminal 20 at time $t_2$; that is, when $t_1$ equals $t_2$.

As is the case when any pulse arrives at terminal 10 of FIG. 1, the generator 11 is activated to produce its gating output signal on conductor 12, said signal being transmitted to conductor 21, and after inversion by inverter 24, to conductor 26. The signals which initially appear at terminals 21 and 26 when pulses arrived at input terminals 10 and 20 simultaneously are transient signals and as such may be neither the 4.5 volt level nor the 0 volt level to which levels the circuit is normally operative to respond.

Thus, there exists the initial possibility that during the transients denoted as $\tau_1$ and $\tau_2$ in the pulse sketch shown at conductor 12 of FIG. 1, both AND gates 19 and 25 may be enabled simultaneously, AND gate 19 by the negative-going transient during $\tau_2$ for example and the lower level voltage pulse from terminal 20, and AND gate 25 by the inverted transient on conductor 26 and the lower level voltage pulse from terminal 20 on conductor 27. This would result in simultaneous pulsing of both the set and reset terminals, S and R respectively, of the flip-flop 29, on conductors 23 and 28 respectively. However, as is well known, a bistable device such as flip-flop 29 does not respond to two such inputs and instead discriminates between the two, as a result of minute component differences within the flip-flop, to select one of the two signals. As will now be demonstrated, the instant invention is arranged so as to provide the predetermined minimum resolution time between the pulses independently of the input signal selected by the flip-flop 29.

Figure 5:
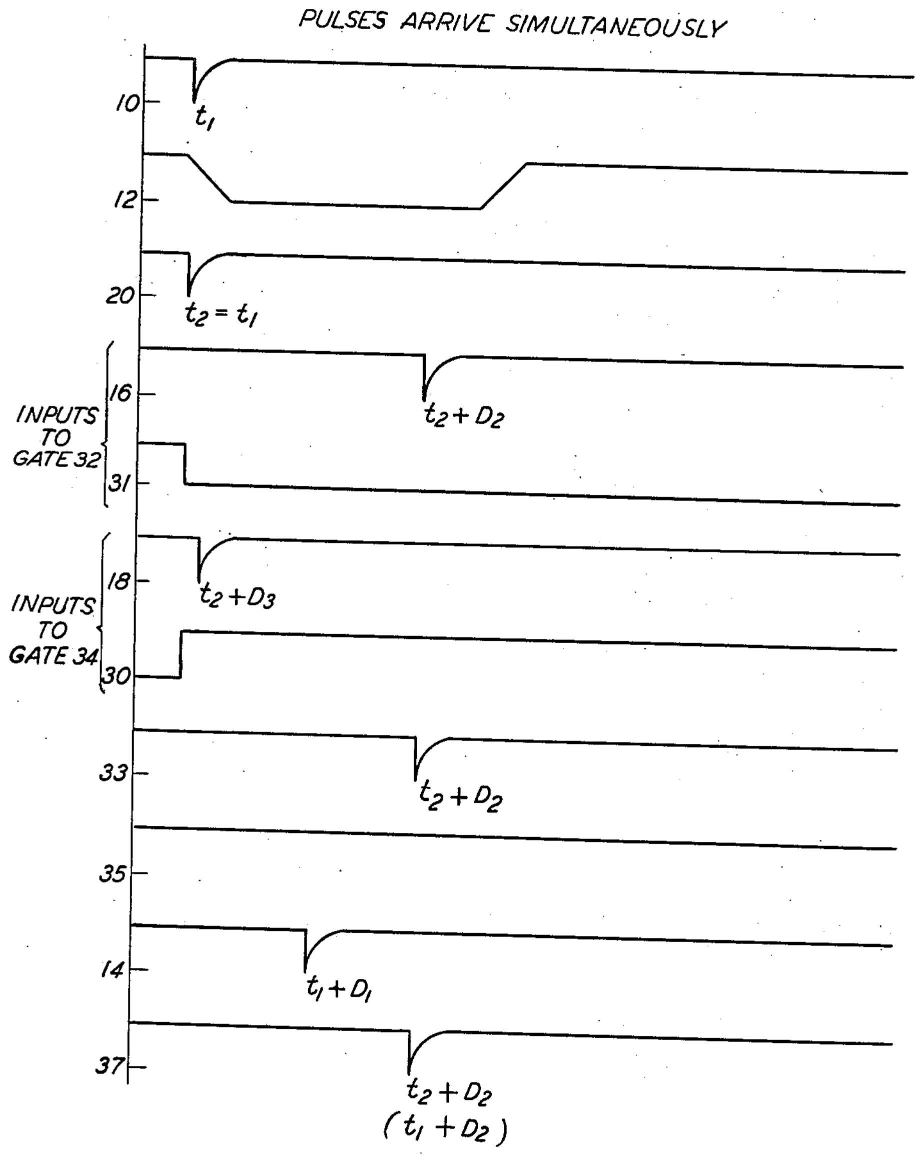

It is initially assumed that the input signal from conductor 23 to the set terminal S of the flip-flop 29 controls the flip-flop in the case of simultaneous pulsing; this is the situation indicated in the time diagram of FIG. 5. Thus, when the flip-flop's input terminals are pulsed, the "1" output on lead 30 switches from its normal 0 volt level to the 4.5 volt level while the "0" output on lead 31 complementarily switches from the 4.5 volt level to the 0 volt level. As with the above-described operational situations with regard to the pulses arriving at input terminals 10 and 20, the input pulse at terminal 20 at time $t_2$ initially activates delay units 15 and 17 respectively, producing a pulse output on lead 16 at time $t_2+D_2$ and a similar output on lead 18 at the earlier time $t_2+D_3$. Regarding the two pairs of inputs to output AND gates 32 and 34 as shown in FIG. 5, at time $t_2+D_2$ both inputs to gate 32 are at the 0 volt level, while at no time are both inputs to gate 34 simultaneously at such a level. Therefore, AND gate 32 will be enabled to allow passage of the pulse output on conductor 33 to OR gate 36 and consequently to lead 37 and utilization circuit 38 at time $t_2+D_2$; no pulse signal will, however, be delivered on lead 35. Since the pulse input terminal 10 had priorly energized delay unit 13, an output pulse signal will appear on conductor 14 at time $t_1+D_1$. From the bottom two lines of FIG. 5, it can be seen that the pulses on conductors 14 and 37 are transmitted to the utilization circuit separated by $(t_2+D_2)-(t_1+D_1)$. Furthermore, since in the case of simultaneous arrival of pulses at terminals 10 and 20, $t_2=t_1$, the pulse resolution circuit has provided an amount of delay equivalent to the difference $D_2-D_1$.

Again using the time values referred to hereinabove, this situation is one in which, as shown in FIG. 5, $t_1=t_2$, and in which delay unit 13 will be energized to provide a pulse output signal on lead 14 to utilization circuit 38 at time $t_1+D_1=(0+25)$ microseconds=25 microseconds. Under the present assumption, delay unit 15 will be effective to delay the input pulse at terminal 20, providing a pulse output to utilization circuit 38 on lead 37 at time $t_2+D_2=(0+47)$ microseconds=47 microseconds. The instant circuit has thus furnished the utilization circuit 38 with pulses now separated in time by (47−25) microseconds=22 microseconds, the established minimum resolution time needed by utilization circuit 38.

Due to the transient condition of the output signal of gate generator 11 mentioned above, a second possible situation with regard to the flip-flop 29 could be that the input pulse on lead 28 to the reset terminal R of the flip-flop 29 would control that device's operation. If such were to be the case, the flip-flop's operation would be identical with that shown on the lines numbered 30 and 31 of FIG. 2; that is, the "1" output on lead 30 would remain at its stable 0 volt level, assumed previously while the "0" output on lead 31 would similarly remain at its 4.5 volt level.

With the activation of delay units 15 and 17 by the input pulse at terminal 20, pulse output signals would again be produced on lead 16 at time $t_2+D_2$ and on lead 18 at time $t_2+D_3$. Under the circumstances assumed for this particular case, however, the simultaneous lower level voltages would appear on the two inputs to AND gate 34 at time $t_2+D_3$, rather than on the inputs to AND gate 32, the latter gate thus being disabled in this situation. With AND gate 34 thereby enabled, a pulse signal will be transmitted on conductor 35 through OR gate 36 and on conductor 37 to the utilization circuit 38 at time $t_2+D_3$. The pulse output due to the input 0 volt pulse on terminal 10 will be transmitted through delay unit 13, appearing on lead 14 connected to utilization circuit 38 at time $t_1+D_1$. The separation between the output pulses on leads 14 and 37 in such a case would be an interval represented by the difference $(t_1+D_1)-(t_2+D_3)$; with $t_1$ being equal to $t_2$ in the case of simultaneous arrival of pulses at terminals 10 and 20, the actual delay interposed by the circuit is that represented by the difference $D_1-D_3$.

In specific time terms, $t_1=t_2$, and an output pulse will again appear on lead 14 at time $t_1+D_1=(0+25)$ microseconds=25 microseconds, due to the energization of delay unit 13. With the input pulse at terminal 20 assumed now to be effectively delayed by the delay unit 17, there will be a pulse output on lead 37 at time $t_2+D_3=(0+3)$ microseconds=3 microseconds. The resultant delay between the pulses thereby provided to utilization circuit 38 on leads 14 and 37 is (25−3) microseconds=22 microseconds, this again being the minimum allowable resolution time for utilization circuit 38.

It is recalled that if the input signal on lead 23 to the set terminal S of flip-flop 29 controlled the flip-flop's operation as in our initial assumption supra, the time separation provided by the circuit was $D_2-D_1$, while in the situation described immediately above, wherein the signal from lead 28 to the reset input R of flip-flop 29 was assumed to have controlled the operation of the flip-flop, the delay was $D_1-D_3$. A third possible situation in the case of simultaneous input pulses with regard to flip-flop 29 is that the flip-flop does not receive a pulse on the set input 23 and also does not receive a pulse on the reset input 28. In this case, the flip-flop remains in its previous state and the appropriate one of the two above-mentioned examples will apply, with an output pulse separation of $D_2-D_1$ or $D_1-D_3$ being provided.

The independence of operation of this circuit from the uncertainty associated with the flip-flop's outputs in the case of simultaneous pulsing of its input terminals is effectively provided by equating those two time differentials. In representative terms $(D_2-D_1)$ is made equal to $(D_1-D_3)$, and it has been shown supra that each of these differentials may be illustratively equal to 22 microseconds. It is thus seen that the circuit will properly operate to sufficiently resolve simultaneously arriving pulses at terminals 10 and 20 when they are delivered to the utilization circuit on conductors 14 and 37 respectively, by a minimum predetermined amount which is independent of the possible uncertain operation of the flip-flop 29 and the gates 19 and 25.

The maximum amount of separation of output pulses is provided by the circuit during Case III operation, when a pulse arrives at input terminal 20 just at the end of the illustrative 50 microsecond interval following an input pulse to terminal 10; if AND gate 32 is thereby enabled, the time differential between the output pulses on leads 37 and 14 will be that represented by the difference [(50+47)−25] microseconds=72 microseconds. Under no circumstances, however, can pulses arriving at terminals 10 and 20 be separated, when they are eventually delivered to the utilization circuit 38, by less than the predetermined minimum interval which in the specific examples cited has been given as 22 microseconds.

It is understood that the above-described arrangements are merely illustrative of the principles of this invention. Numerous and varied other arrangements can readily be devised in accordance with these principles by those skilled in the art, without departing from the spirit and scope of the invention.

What is claimed is:

1. In combination for providing at least a predetermined resolution period between randomly occurring pulses, a utilization circuit, a first input terminal and a second input terminal, a plurality of delay elements of different time values, a first of said delay elements connected between said first input terminal and said utilization circuit, gate generator means for providing an output signal of predetermined interval, bistable switching means, first gating means coupling said generator means to said bistable switching means and responsive to similarly polarized signals from said gate generator and from said second input terminal, second gating means responsive to similarly polarized signals from said bistable switching means and from a second and a third of said delay elements, and means including said bistable switching means for selectively determining which one of said second and said third delay elements will effectively delay said pulses arriving at said second input terminal.

2. A circuit in accordance with claim 1 including in addition output gating means, and wherein said pulses are of two electrical levels, and means including said first gating means and said second gating means responsive to the simultaneous application of a lower of said levels to control said bistable switching means and said output gating means.

3. A circuit in accordance with claim 2 including means for disabling said second gating means if said pulses arrive at said first and said second input terminals during said predetermined interval.

4. A pulse resolution circuit comprising first and second input terminals, a first transmission path including first delay means coupled to said first input terminal, second and third transmission paths respectively including second and third delay means coupled to said second input terminal, gate generator means responsive to signals at said first input terminal to produce an output signal of predetermined interval, control means operative to selectively block the passage of signals from said second input terminal through one of said second and said third transmission paths, first gating means responsive to said gate generator output signal and to said signals at said second input terminal to deliver a signal to said control means, and means including said control means for selectively delaying the passage of said signals from said second input terminal by the time delay of said second delay means if said signals arrive at said second input terminals within said predetermined interval of the arrival of said signals at said first input terminal and by the time delay of said third delay means if said signals arrive at said second input terminal without said predetermined interval of the arrival of said signals at said first input terminal.

5. A pulse resolution circuit in accordance with claim 4 wherein said control means includes a flip-flop device.

6. A pulse resolution circuit in accordance with claim 5 further comprising second gating means responsive to the simultaneous application of similarly polarized signals from said second and said third delay means and from said flip-flop to selectively pass said signals from said second input terminal through one of said second and said third paths.

7. A pulse resolution circuit in accordance with claim 5 including in addition inverter means, wherein said first gating means includes a first AND gate responsive to said gate generator output signal and to signals at said second input terminal within said predetermined interval to deliver a signal to one input of said flip-flop, and a second AND gate responsive to inverted signals through said inverter means from said gate generator means and to signals at said second input terminal without said predetermined interval to deliver a signal to the other input of said flip-flop.

8. A pulse resolution circuit for providing at least a predetermined time separation between randomly occurring first and second signals comprising means for applying said first signal to a first path having a first predetermined delay interval, means for directly applying said second signal both to a second path and to a third path, said second path having a delay appreciably greater than and said third path having a delay appreciably less than that of said first path, first control means responsive to the application of said first signal to said first path and to the application of said second signal to said second and third paths for maintaining said third path blocked and for simultaneously unblocking said second path both during the passage of said first signal through said first path for said first delay interval and for an equal interval thereafter, and second control means responsive to said application of said first signal and to said application of said second signal for maintaining said second path blocked and for simultaneously unblocking said third path after the expiration of said equal interval.

9. A pulse resolution circuit for providing at a utilization circuit a delay of at least a predetermined time separation between pulses randomly applied to a plurality of distinct input terminals comprising generator means responsive to the arrival of a first one of said pulses at one of said terminals for furnishing a gating signal of a predetermined interval, a plurality of distinct delay means connected between said input terminals and said utilization circuit, controlling means jointly responsive to said gating signal and to one of said randomly applied pulses at another of said input terminals for selectively determining which one of said plurality of delay means will delay said last-mentioned one of said pulses, said controlling means including a first AND gate energized by said gating signal during said predetermined interval, a second AND gate blocked during said predetermined interval, and bistable switching means selectively responsive to signals from said first and said second AND gate, output gating means connected to said bistable switching means and to said plurality of delay means for selectively blocking the passage of pulses through said plurality of delay means, said output gating means including a third and a fourth AND gate controlled by said bistable switching means, said third AND gate blocking pulses from being transmitted through one of said plurality of delay means if said one of said pulses applied at said another of said input terminals switches said bistable switching means within said predetermined interval of the arrival of said first one of said pulses at said first-mentioned one of said input terminals and said fourth AND gate blocking said pulses from being transmitted through a second of said plurality of delay means if said one of said pulses applied at said another of said input terminals switches said bistable switching means without said predetermined interval.

10. A pulse resolution circuit comprising a utilization circuit, generator means for providing a stable voltage level output and a quasi-stable voltage level output, bistable switching means, a plurality of delay elements, first gating means responsive to a transition between said stable and said quasi-stable levels to deliver signals to said bistable switching means, and second gating means coupled to said bistable switching means and to a first and a second of said plurality of delay elements, said second gating means being selectively responsive to signals from said bistable switching means and from said first and said second of said plurality of delay elements to provide a signal to said utilization circuit.

11. A pulse resolution circuit in accordance with claim 10 wherein said generator means provides said quasi-stable level for a predetermined interval exclusive of the duration of said transition between said stable and said quasi-stable levels and further comprising input means for energizing said first gating means during said duration of said transition.

12. A pulse resolution circuit in accordance with claim 11 wherein said first gating means includes a first and a second AND gating means jointly energizable by signals from said input means during said duration of said transition, said first AND gating means being individually energized by signals from said input means within said predetermined interval, and said AND gating means being individually energized by signals from said input means without said predetermined interval and without said duration of said transition.

References Cited in the file of this patent

UNITED STATES PATENTS

| | | |
|---|---|---|
| 2,858,429 | Heywood | Oct. 28, 1958 |
| 3,019,350 | Gauthey | Jan. 30, 1962 |